United States Patent Office 3,366,675
Patented Jan. 30, 1968

3,366,675
PROCESS FOR THE PREPARATION OF
ORGANO-PHOSPHORUS COMPOUNDS
Jimmie K. Dyer, Cincinnati, Ohio, assignor to The
Procter & Gamble Company, Cincinnati, Ohio, a
corporation of Ohio
No Drawing. Filed Mar. 30, 1965, Ser. No. 444,031
9 Claims. (Cl. 260—502.4)

This invention relates to the preparation of organo-phosphorus reaction products and more especially to an improved process for reacting ketene and phosphorous acid to prepare ethane-1-hydroxy-1,1-diphosphonic acid, $CH_3C(OH)(PO_3H_2)_2$, which has the following formula:

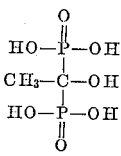

Diphosphonic acids and derivatives thereof are known compounds, methods for their preparation having been described as early as 1897, by H. von Baeyer and K. A. Hofmann, Ber. 30, 1973–8 (1897). Other pertinent references include B. T. Brooks, J. Am. Chem. Soc., 34, 492–9 (1912); German Patent 1,010,965 dated May 8, 1956; German Patent 1,072,346 dated Dec. 31, 1959; German Patent 1,082,235 dated May 25, 1960; German Patent 1,107,207 dated May 25, 1961; British Patent 940,138 dated Oct. 23, 1963; and United States Patent 3,159,581, dated Dec. 1, 1964. Some of these references discuss also the uses and applications of ethane-1-hydroxy-1,1-diphosphonic acid and salts thereof which cover widely their use as sequestering and complexing agents as well as a builder in detergent compositions.

Ketene, $C_2H_2O$, has the structure $H_2C=C=O$, boils at about $-41°$ C., and thus is a gas at room temperature. Although it can be stored for reasonable periods of time in a pure state at Dry Ice temperature or below, it is extremely reactive and very readily polymerizes, going first to its dimer, diketene, and then to higher polymers. In the presence of impurities such as acids or bases, the polymerization takes place with almost explosive violence.

C. D. Hurd and A. S. Roe of Northwestern University, in an article published in 1939 in The Journal of the American Chemical Society, vol. 61, 3355–3359 (1939), state that ketene behaves as an acetylating agent toward some hydroxyl-containing compounds and that it is non-reactive or sluggish toward others. The statement is made that in the presence of a sulfuric acid or p-toluenesulfonic acid catalytic agent, ketene can be used to acetylate phenol, t-butyl alcohol, or t-pentyl alcohol at room temperature. In the absence of the sulfuric catalysts, however, no reaction is observed.

There is also a reference to ketene as an acetylating agent in Belgium Patent 591,066, dated May 20, 1960. This patent relates to the use of "acylation products of phosphorous acid" as stabilizers for peroxy compounds such as hydrogen peroxide, perborates, persulfates and the like. The statement is made that the acylation products can be prepared by reacting acetic anhydride and phosphorous acid at temperatures of 20° C. to 120° C. in molar proportions of 1:1 to 1:2. The acetic anhydride can be replaced in part with acetyl chloride if the reaction is run at temperatures in the range of 70 to 120° C. Ketene is mentioned along with ketene-acetal as other usable acetylating agents useful in the preparation of reaction products which possess the characteristic group:

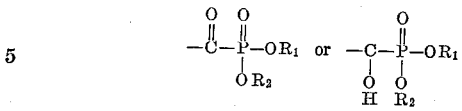

in which $R_1$ and $R_2$ are hydrogen or a hydrocarbon radical. The Belgium patent thus equates ketene with acetic anhydride, acetyl chloride and ketene acetal as an acylating agent for phosphorous acid. It is important to note that the Belgium disclosure teaches no special precautions or reaction conditions which should be used in conjunction with ketene that would differentiate it from the other acylating agents mentioned. As a matter of fact, clear inference from this and other prior art references is that ketene, for all practical purposes, is in the usual class of acetylating agents for phosphorous acid.

It has now been discovered that that is not the case at all. If hot ketene gas as it is usually prepared is bubbled directly into phosphorous acid solution, they react to form a conglomerate solid mass which is almost impossible to analyze by known analytical techniques. There is, therefore, no known method of reacting ketene and phosphorous acid to prepare ethane-1-hydroxy-1,1-diphosphonic acid, notwithstanding these loose literature statements.

It is an object of the present invention to provide a process which does make possible a useful reaction between ketene and phosphorous acid. It is another object to provide an improved process for preparing an organo-phosphorus reaction product comprising ethane-1-hydroxy-1,1-diphosphonic acid by reacting ketene with phosphorous acid. These and other objects will become apparent from a careful reading of the following description of the present invention.

According to the present invention, it is possible to react ketene and phosphorous acid to prepare a reaction product containing ethane-1-hydroxy-1,1-diphosphonic acid by employing a process which comprises essentially the steps of preparing a reaction mixture of ketene and phosphorous acid containing a molar excess of ketene by passing ketene gas into a solution of phosphorous acid while both the ketene gas and the solution of phosphorous acid are at a temperature within the range of from about $-20°$ C. to about 50° C., thereafter heating the reaction mixture to a temperature in the range of from about 90° C. to about 140° C. for a period of at least 15 minutes.

It will be seen that the process embodies two essential and critical steps: the first step consists of mixing ketene and a solution of phosphorous acid at a low temperature, followed by a second step of heating the reaction mixture at an elevated temperature for a critical period of time to effect the reaction.

It has been discovered that the mixing of the ketene reactant and the solution of the phosphorous acid reactant, e.g., by bubbling the ketene gas into the phosphorous acid solution, must be performed at a temperature in the range of from about $-20°$ C. to about 50° C., and preferably in a range of from 0° C. to 40° C.

When temperatures higher than 50° C. are used during the ketene addition, it has been discovered that either no reaction occurs at all or, alternatively, a reaction occurs which is totally uncontrolled and undirected and which results in the formation of a reaction product having an unknown composition. Temperatures below $-20°$ C. can be used, but as a practical matter, the need for special cooling equipment and apparatus makes this impractical. In any event, no apparent advantages can be gained by operating below $-20°$ C.

According to the present invention, the reaction requires the use of an excess amount of ketene. This is somewhat surprising. It could be expected that since the desired diphosphonic reaction product contains in its structure two phosphorous-containing moieties, that it would be necessary to use an excess of the phosphorous acid reactant. On the contrary, it has been surprisingly discovered that the ketene must be used in a molar excess that the molar proportion of ketene to phosphorous acid must be in the range of from about 1.05:1 to about 4:1. According to a preferred embodiment of the present invention, the reaction should be conducted using a molar proportion of ketene to phosphorous acid in the range of 1.2:1 to 3:1.

Phosphorous acid, $H_3PO_3$, is a white crystalline material having a melting point of 70.1° C. It can be formed by dissolving phosphorous oxide in water or by the action of water upon phosphorus trichloride:

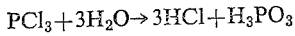

$$PCl_3 + 3H_2O \rightarrow 3HCl + H_3PO_3$$

It is a dibasic acid and can form two classes of phosphite salts. In order for it to be mixed with ketene at the low temperature necessary in the first step of the process, the phosphorous acid must be in solution. This can be accomplished satisfactorily by dissolving the phosphorous acid in any organic solvent which dissolves the acid adequately and which is inert to the reactants. Particular solvents which have been found to be especially preferred are tributylamine, pyridine, acetic acid, dioxane, butyl ether, symmetrical tetrachloroethane, and toluene. The amount of solvent used to prepare the solution of phosphorous acid is not itself important and can vary widely. For any given reaction system, a satisfactory amount can readily be determined. The solvent can be used from about 20% to about 90% by weight based on the weight of the phosphorous acid.

After the phosphorous acid solution has been prepared and the prescribed molar excess of ketene has been bubbled into the solution to prepare the reaction mixture, the reaction mixture is heated in the second essential step of the process to a temperature in the range of from about 90° C. to about 140° C., preferably from 100° C. to 130° C., and the temperature maintained for at least 15 minutes. This minimum time period has been established empirically as being the shortest time period in which the reaction provides a reaction product which contains substantial amounts of ethane-1-hydroxy-1,1-diphosphonic acid. The reaction can last for as long as about 150 minutes, but the preferred reaction time at the elevated temperature range is from 30 minutes to 60 minutes. Reaction periods lasting longer than 150 minutes can be used but without any apparent advantages.

As far as is known, ketene is not available commercially. It is generally made for use in on-site processes such as for acetic anhydride manufacturing by the thermal decomposition or pyrolysis of acetic acid or acetone. A chain mechanism involving radicals has been proposed to explain the pyrolytic decomposition. The acetic acid decomposition results in the formation of ketene and water. The acetone decomposes to ketene and methane. The latter method is the one that was employed in the present invention, although either method or any alternative method could be used as a source for the ketene reactant.

As freshly prepared by the thermal decomposition processes mentioned above, the ketene can have a temperature on the order of about 680° C.–800° C. or even higher. The present invention requires that the ketene be cooled to a temperature below about 50° C., i.e., into the range of −20° C. to 50° C., before it can be bubbled into the solution of phosphorous acid. If this preferred embodiment of the present invention is not adhered to, the hot ketene gas would react with the phosphorous acid as it is introduced into the solution in an uncontrollable reaction. The result is the formation of an unidentifiable conglomerate reaction mass that has no known value either as a process or a reaction product.

It is also desirable to have the phosphorous acid solution stirred or agitated during the addition of the ketene. This can be accomplished simply by positioning a stirring means within the reaction vessel.

The reaction does not require any special type of reactor apparatus such as a pressure reactor. Any ordinary batch reactor made from glass, stainless steel, or other inert material can be satisfactorily used.

The following examples are illustrative of the present invention, and while they cover the preferred embodiments of the present invention, it will be readily apparent to one skilled in the art that obvious modifications could be made in the procedures employed and described herein. All parts are by weight unless otherwise specified.

EXAMPLE I

Acetone was fed into a heated flask at a rate of 8 ml. per minute and the resultant acetone vapor was caused to pass through a heated quartz tube which was packed with porcelain saddle packing material. The quartz tube was contained inside an electrically heated furnace. A thermocouple was placed in the packed section of the tube and the voltage to the furnace controlled to give a temperature of about 715° C. at the point of the thermocouple location. Upon passing into the hot zone of the tube, a portion of the acetone vapor was pyrolyzed to give a mixture of ketene, methane, which is a by-product, and unreacted acetone. The vapor mixture from the packed pyrolysis tube was passed through a condenser which was cooled by a stream of recirculating chloroform maintained at a temperature of −30° to −37° C. In this condenser, the bulk of the unreacted acetone was condensed and subsequently removed from the system through a drain valve. The gas stream was then introduced into a reaction flask by means of a diptube. The reaction flask was equipped with a mechanical stirrer and a reflux condenser which used a coolant at a temperature of about −78° C. The reaction flask had been previously charged with 33.2 parts of phosphorous acid and 147 parts of pyridine. The flask and its contents (phosphorous acid and pyridine) were cooled to 15° C. prior to introduction to any ketene reactant. Once the ketene stream was started feeding into the flask, the flask temperature was held in the range of 20 to 28° C. by supplying cooling as required. After a total time of 30 minutes from the start of the ketene addition, it was calculated that the quantity of ketene added was 33.6 parts. The ketene feed was discontinued at this point and the pyridine solution in the flask was heated to 105° C. for a period of 130 minutes, after which the flask and its contents were cooled. The solution of crude product in pyridine was neutralized to a pH of 9 with potassium hydroxide and washed with ethyl ether to remove the pyridine. The neutralized product was freeze dried to yield 107.7 parts of dry product.

Examination of the product by means of phosphorus NMR showed the following details.

| Peak code: | Chemical shift, p.p.m. (relative to 85% $H_3PO_4$) |
|---|---|
| A | −6.5 |
| B | −8.5 |
| C | −13.2 |
| D | −16.6 |
| E (Ethane-1, hydroxy-1,1-diphosphonic acid) | −18.9 |

The peaks coded A, B, C, and D are by-products of unknown structure, but peak E is the desired ethane-1-hydroxy-1,1-diphosphonate reaction product. Thus, it is seen that while in this example detectable amounts of undesired by-products were present, the yield of ethane-1-hydroxy-1,1-diphosphonic acid species was 30%, by weight of the total reaction product.

The reaction product was tested for calcium sequestering ability on an as-is basis, using a modified oxalate test which is described in The Journal of Physical Chemistry, vol. 64, 1398 (1960), written by R. R. Irani and C. F.

Callis. The value obtained was 6.2 g. of calcium/100 g. product calculated on the basis of trisodium ethane-1-hydroxy-1,1-diphosphonate ($Na_3EHDP$). The basis can be converted to, for example, $K_3EHDP$ by ratio of the molecular weight. This value of 6.2, which at first seems low, is seen to be a result of the presence of appreciable quantities of less effective by-product organophosphorus compounds in the sample. This is in addition to 3.5% dipotassium hydrogen phosphite, 4.1% water, and 36.8% potassium acetate which were also found to be present in the sample. Thus, the organophosphorus portion of the sample is seen to be about 56%. Correction of the sequestering value using a figure of 56% active gives a value of about 11 g. Ca/100 g. active product.

EXAMPLE II

In the same manner as in Example I, acetone was partially pyrolyzed to ketene. The ketene was likewise passed into a flask which contained 33.2 parts of phosphorous acid and 147 parts of pyridine. During the ketene addition, the flask and its contents were held to the temperature range of 28 to 34° C. Once the amount of ketene added reached 21.8 parts, its flow was stopped and the flask and its contents were heated to about 107° C. One hour and five minutes later, the flask was cooled. The crude product was diluted with distilled water and then heated under vacuum to remove the pyridine; considerable water was also evaporated so that it was necessary to periodically add additional water to the crude product solution. Once the aqueous solution was free of pyridine, it was neutralized to a pH of 9 with KOH and the aqueous salt solution was washed with ethyl ether to remove any remaining pyridine. A portion of the solution was then vacuum dried. The dry product was tested for ability to sequester calcium ions using the caprate test. The value found for the crude product was 6.4 g. calcium/100 g. of the product calculated on the basis of trisodium ethane-1-hydroxy-1,1-diphosphonate as the active agent. Chemical analysis showed the sample to contain about 8% water, 3.7% potassium acetate and 5.8% pyridine. Subsequent examination of the product by means of phosphorus NMR showed the following details.

| Peak | Chemical Shift, p.p.m. | Mole Percent of Phosphorus |
|---|---|---|
| A | +8.2 | 16.4 |
| B | −2.9 | 4.1 |
| C | −6.0 | 5.7 |
| D | −10.0 | 12.1 |
| E | −14.5 | 16.4 |
| F | −16.2 | 17.7 |
| G | −19.6 | 27.5 |

It is seen from the NMR information that about 33% of the starting $H_3PO_3$ is still unreacted (peaks A and E). The yield of ethane-1-hydroxy-1,1-diphosphonic acid was about 30% of the total reaction product.

EXAMPLE III

In the manner described in Example I, 21.8 parts of ketene were added to 33.2 parts of phosphorous acid and 100 parts of tributyl amine in a flask. During the ketene addition, the reaction temperature was held in the range of 24–27° C. The time of ketene addition was about 62 minutes. After the ketene flow was halted, the temperature of the reaction mixture was raised to 120° C., and the reaction continued for about 2½ hours after the ketene addition was halted.

After water was added to the product, it was neutralized to a pH of 9 with potassium hydroxide, and the amine layer which separated out was removed. A sample of the dry product was tested for its ability to sequester calcium ions using the caprate test and a value of 7.1 g. calcium per 100 g. of product was obtained calculated on an active basis of trisodium ethane-1-hydroxy-1,1-diphosphonate. The sample was examined by means of phosphorus NMR with the following findings.

| Peak | Chemical shift, p.p.m. |
|---|---|
| A | +8.6 |
| B | −15.1 |
| C | −17.1 |
| D | −20.2 |

Peaks A and B are due to unreacted phosphorous acid in the sample and peak D is the desired ethane-1-hydroxy-1,1-diphosphonic acid reaction product, while peak C is an organophosphorus compound of undetermined structure. The yield of ethane-1-hydroxy-1,1-diphosphonic acid was 32%, by weight of the total reaction product.

EXAMPLE IV

In the manner described in Example I, 21.8 parts of ketene were added to a solution of 33.2 parts of phosphorous acid in 84 parts of acetic acid. During the ketene addition period, which required 30 minutes, the reaction mixture in the flask was held to the temperature range of 9–16° C. After the ketene addition period was ended, the reaction mixture was heated to about 118° C. and refluxed for 45 minutes at that temperature. The crude product was diluted with water and then heated under vacuum to drive off a mixture of acetic acid and water; additional water was added as needed to maintain a solution in the flask. After the above step, the aqueous solution of product was neutralized to a pH of 9 with potassium hydroxide and vacuum dried at 90° C. The dried product was found to contain about 4.5% water and 38.8% unreacted phosphorous acid in the form of dipotassium hydrogen phosphite, $K_2HPO_3$. The product was tested for its ability to sequester calcium ions and found to have a value of 7.1 g. calcium/100 g. product when calculated on the basis of trisodium ethane-1-hydroxy-1,1-diphosphonate. The product was also examined using phosphorus NMR equipment and the following data obtained.

| Peak | Chemical Shift, p.p.m. | Mole Percent of Phosphorus |
|---|---|---|
| A | +8.0 | 42 |
| B | −14.5 | |
| C | −17.0 | .6 |
| D | −19.6 | 35 |
| E | −21.4 | 17 |

Peaks A and B are due to $K_2HPO_3$ and peak D is the desired diphosphonic acid reaction product. Peaks C and E represent organophosphorus compounds of undetermined structure. It is seen that under the reaction conditions used in this example, ethane-1-hydroxy-1,1-diphosphonic acid was the major organophosphorus product formed. The difference in the analytical and NMR values for $K_2HPO_3$ is due mainly to the fact that only phosphorus-containing compounds are detected in phosphorus NMR. The yield of ethane-1-hydroxy-1,1-diphosphonic acid was 32%, by weight of the total product.

EXAMPLE V

In the same manner described in the preceding examples, 19.7 parts of ketene were added to a mixture of 33.2 parts of phosphorous acid, 3.9 parts of acetyl chloride, and 154 parts of dioxane in a reaction flask. During the period of ketene addition, about 33 minutes, the temperature was held to about 18° C. After the ketene addition was complete, the flask and its contents were heated to 100° C. over a period of 35 minutes and then held at 100° C. for an additional 60 minutes. The product was diluted with water and the dioxane removed by heating the solution under vacuum. The solution was then neutralized to pH 9 with potassium hydroxide and vacuum dried at 90° C. and about 25 inches of vacuum. The dried product was tested for its ability to sequester calcium ions and a value of 9.6 g. calcium per 100 g. of product obtained.

The value was calculated on the basis of a trisodium ethane-1-hydroxy-1,1-diphosphonate active. The same value is 8.2 when expressed on the basis of a corresponding tripotassium active. Chemical analysis showed the product to contain 32.3% $K_2HPO_3$ and 5.6% water. An examination of the product by means of phosphorus NMR yielded the following data.

| Peak | Chemical Shift, p.p.m. | Mole Percent of Phosphorus |
|---|---|---|
| A | +8.0 | 19 |
| B | −3.3 | 2 |
| C | −10.6 } | 13 |
| D | −13.0 } | |
| E | −14.6 | 19 |
| F | −17.0 | 9 |
| G | −19.7 | 38 |

Peaks A and E are due to $K_2HPO_3$ and Peak G is the desired ethane-1-hydroxy-1,1-diphosphonate product. The other peaks are due to unidentified organophosphorus compounds. It is seen that a major portion of the organophosphorus material is in the form of ethane-1-hydroxy-1,1-diphosphonate species. The yield of ethane-1-hydroxy-1,1-diphosphonic acid was 44% of the total reaction product.

EXAMPLE VI

In the manner described in the previous examples, 33.6 parts of ketene were added to 33.2 parts of phosphorous acid and 154 parts of dioxane. After being held at about 10° C. during the 80-minute addition period, the reaction mixture was heated at about 100° C. for 90 minutes. The crude product was diluted with water and the dioxane removed by heating under vacuum. The product was neutralized to pH 9 with potassium hydroxide and vacuum dried. The caprate test was used to measure the ability of the product to sequester calcium ions and a value of 4.8 g. calcium per 100 g. of product was obtained. The yield of tri-potassium ethane-1-hydroxy-1,1-diphosphonate was 26% by weight of the total reaction product.

EXAMPLE VII

In the manner used in Example I, 33.6 parts of ketene were added to 33.2 parts of phosphorous acid and about 154 parts of acetic acid. The temperature during the 40-minute ketene addition period was in the range from 9–16° C. and during the latter 180-minute reflux period was 118° C. The crude product was treated with heat and vacuum to remove the acetic acid and was then neutralized to pH 9 with potassium hydroxide and vacuum dried. The dry product was tested for its ability to sequester calcium ions using the caprate test and a value of 4.25 g. calcium per 100 g. of product based on $K_3EHDP$ was obtained. The value based on trisodium ethane - 1-hydroxy-1,1-diphosphonate is 5.0. An iodine titration showed the product to contain 3% of $K_2HPO_3$. The sample was also examined by means of phosphorus NMR with the following findings.

| Peak | Chemical Shift, p.p.m. | Mole Percent Phosphorus |
|---|---|---|
| A | +8.0 | 1.2 |
| B | −3.3 | 1.8 |
| C | −12.4 | 17.3 |
| D | −14.4 | 1.8 |
| E | −19.2 | 28.5 |
| F | −21.3 | 49.4 |

Peaks A and D are due to $K_2HPO_3$, peak B is likely due to potassium orthophosphate, and peak E is the desired ethane - 1-hydroxy-1,1-diphosphonic acid reaction product. Peaks C and F are due to other organophosphorus compounds of unknown structure. The yield of tri-potassium ethane - 1-hydroxy-1,1-diphosphonate was 23%, by weight of the total reaction product.

To demonstrate the improvement which the present invention provides over the prior art, the following two preparations are given. Both of the preparations were run according to what is thought to be the state of the prior art before the discovery leading to the present invention, although it is quickly pointed out that no literature references exist which actually teach the use of ketene to prepare ethane-1-hydroxy-1,1-diphosphonic acid.

The value of the following two preparations is that they demonstrate vividly the critical nature of the embodiments and teachings of the present invention.

By Preparation A, not even a trace of ethane-1-hydroxy-1,1-diphosphonic acid was obtained. Preparation B yielded only a small amount of the desired diphosphonic acid reaction product.

PREPARATION A

Following the teaching of the prior art, 16.8 parts of ketene were added into 66 parts of phosphorous acid and 310 parts of dioxane contained in a reaction flask. The temperature was maintained at about 90° C. during the 43-minute period of ketene addition. Examination of the crude product and three intermediate samples by means of phosphorus NMR showed that not even a trace of organophosphorus compounds had been formed. The only peaks seen in the NMR spectrum were those of the H-P doublet of phosphorous acid.

PREPARATION B

Again using the prior art teachings, 16.8 parts of ketene were added to 33.2 parts of phosphorous acid and 157 parts of acetic acid. During the 45-minute ketene addition period, the temperature was maintained in the range of 75–90° C. After all of the ketene was added, the reaction mixture was held at 90° C. for an additional 30 minutes. The acetic acid was evaporated from the crude product and the remaining product was neutralized to pH 9 with potassium hydroxide. After vacuum drying, the product was tested for its ability to sequester calcium ions and a value of only 0.64 g. calcium per 100 g. of product found based on tripotassium-ethane-1-hydroxy-1,1-diphosphonate. An iodine titration showed the product to contain about 41% of $K_2HPO_3$, dipotassium hydrogen phosphite. The product was also examined by means of phosphorus NMR and the following data obtained.

| Peak | Identity | Chemical Shift, p.p.m. | Mole Percent Phosphorus |
|---|---|---|---|
| A | } $K_2HPO_3$ | { +8.0 | } 61 |
| B |  | −14.8 |  |
| C | $K_3EHDP$ | −19.1 | 7 |
| D | Unknown | −21.5 | 32 |

From the NMR spectral information it is apparent that not only was EHDP produced in a very small proportion, but that a large part of the initial $H_3PO_3$ reactant was converted to an organophosphorus compound of unknown structure and utility.

Each of the preceding examples involved batch operations and the yields of the desired ethane-1-hydroxy-1,1-diphosphonate might appear low. It should be noted, however, that according to the state of the prior art, proven by Preparations A and B, such a reaction could not be performed at all or with only trace amounts of the desired ethane-1-hydroxy-1,1-diphosphonate containing reaction product.

Another embodiment of the present invention, demonstrated by Example V above, provides for the addition to the reaction solution of a small proportion of acetyl chloride. As has been mentioned previously, the chemistry of ketene in the present reaction system is extremely complex and the mechanism is not fully known.

What is thought to happen is that the acetyl chloride reacts with phosphorous acid to form an acetylated phosphorous acid compound and hydrochloric acid, according to the following equation:

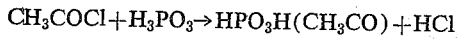

The hydrogen chloride, in turn, reacts with ketene to form acetyl chloride, according to the following equation:

This represents a cyclic process that will continue until either the ketene or phosphorous acid reactant has been consumed. The advantage of this reaction is that the acetylated phosphorous acid is thought to be a valuable intermediate reaction product that directs the reaction toward the formation of ethane-1-hydroxy-1,1-diphosphonic acid.

The acetyl chloride reactant should be used at a level of from about 5 mol percent to about 15 mol percent based on the amount of ketone used, and preferably from 7 mol percent to 15 mol percent.

The same results can be achieved by passing into the reaction solution a corresponding amount of hydrogen chloride gas, thereby generating acetyl chloride, in situ. Alternatively, one can add a corresponding amount of phosphorous trichloride which could react with either ketene or phosphorous acid to produce a cyclic reaction sequence similar to that described above.

Moreover, the present process and the yield figures presented in the examples are based on batch operations. By converting the process into a continuous process in which the solvent, unused phosphorous acid, and by-products are recycled, the yield data can be substantially improved.

Thus, it will be seen that the present process consists essentially of preparing ketene by decomposing acetone or acetic acid, cooling and purifying the thus-formed ketene gas, bubbling it into a solvent solution of phosphorous acid in a temperature ranging from about −20° C. to about 50° C. until a molar excess of ketene to phosphorous acid has been provided, or more specifically, until the molar ratio of ketene to phosphorous acid in the reaction mixture is in the range of 1.05:1 to 4:1 respectively, preferably 1.2:1 to 3:1, and thereafter heating the reaction mixture to a temperature within the range of from about 90° C. to about 140° C. for a period of at least 15 minutes, or more specifically, for 15 to 150 minutes, or preferably from 30 to 60 minutes.

Although the invention has been described with a certain degree of particularity, it is understood that the present disclosure has been made only by way of example and that numerous changes in the details thereof may be resorted to without departing from the spirit and scope of the invention as hereinafter claimed.

The invention having been fully described above, what is sought to be protected by a Letters Patent is:

I claim:
1. A process for reacting ketene with phosphorous acid which consists essentially of the steps of preparing a reaction mixture by mixing ketene and phosphorous acid in a molar ratio respectively of from about 1.05:1 to about 4:1 at a temperature in the range of from about −20° C. to about 50° C., and thereafter heating the reaction mixture to a temperature in the range of from about 90° C. to about 140° C. for a period of at least 15 minutes.

2. A process according to claim 1 in which said reaction mixture contains ketene and phosphorous acid in a molar proportion, respectively, of from 1.2:1 to 3:1.

3. A process according to claim 1 in which said ketene and said phosphorous acid are mixed at a temperature range of from 0° C. to 40° C.

4. A process according to claim 1 in which the temperature during the heating step is in the range of 100° C. to 130° C.

5. A process according to claim 1 in which said reaction mixture is heated for a period of from about 15 to about 150 minutes.

6. A process according to claim 5 in which the elevated temperature during the reaction is held for a period of 30 minutes to 60 minutes.

7. In a process for the preparation of an ethane-1-hydroxy-1,1-diphosphonic acid containing reaction product by reacting ketene and phosphorous acid, the improvement which comprises preparing a reaction mixture by bubbling ketene into a solvent solution of phosphorous acid at a temperature in the range of from about −20° C. to about 50° C. until the ketene and phosphorous acid reactants are present in a molar ratio respectively of from about 1.05:1 to about 4:1 and thereafter heating said reaction mixture to a temperature in the range of from about 90° C. to about 140° C. and maintaining the elevated temperature for at least 15 minutes.

8. A process according to claim 1 in which acetyl chloride is added to said reaction solution in an amount corresponding to from about 5 mol percent to about 20 mol percent, based on the amount of said ketene present in said reaction mixture.

9. A process according to claim 8 in which said acetyl chloride is added to said reaction solution in an amount corresponding to from 7 mol percent to 15 mol percent based on the amount of said ketene present in said reaction mixture.

References Cited

UNITED STATES PATENTS 3,122,417    2/1964    Blaser et al. _____ 260—500

OTHER REFERENCES

Kennedy et al.: "Chem. & Ind.," 1956, p. 930.

McConnell et al.: "Jour. Org. Chem.," vol. 23, pp. 830–831 (1958).

LEON ZITVER, *Primary Examiner.*